United States Patent [19]

Hoshino et al.

[11] 4,242,472

[45] Dec. 30, 1980

[54] VULCANIZABLE RUBBER COMPOSITION IMPROVED IN SULFUR BLOOMING WITH METAL ALKYLXANTHATE

[75] Inventors: Takashi Hoshino, Kodaira; Setsuko Imaizumi, Tokyo; Seisuke Tomita, Higashimurayama, all of Japan

[73] Assignee: Bridgestone Tire Company Limited, Tokyo, Japan

[21] Appl. No.: 10,349

[22] Filed: Feb. 8, 1979

[30] Foreign Application Priority Data

Feb. 17, 1978 [JP] Japan .................................. 53-16430

[51] Int. Cl.$^3$ ........................ C08F 8/34; C08C 19/00
[52] U.S. Cl. .................................. 525/343; 260/775; 260/785; 525/332; 525/335; 525/340; 525/346; 525/349; 525/352
[58] Field of Search ............... 260/785, 793, 794, 795, 260/783, 775; 525/340, 332, 343, 334, 349, 335, 352

[56] References Cited

U.S. PATENT DOCUMENTS

| | | | |
|---|---|---|---|
| 1,406,719 | 2/1922 | Bedford | 260/794 |
| 1,440,963 | 1/1923 | Cadwell | 260/794 |
| 1,940,280 | 12/1933 | Williams | 260/793 |
| 2,024,925 | 12/1935 | Hirschkind | 260/793 |
| 2,952,650 | 9/1960 | Wood | 525/343 X |
| 3,023,460 | 3/1962 | Hartman | 526/33 |
| 3,458,461 | 7/1969 | Mihal | 526/33 |
| 3,501,423 | 3/1970 | Tate | 260/749 |
| 3,651,009 | 3/1972 | Cameli | 526/33 |
| 3,746,674 | 7/1973 | Behrens | 526/33 |
| 3,812,087 | 5/1974 | Dillenschneider | 526/27 |
| 3,856,729 | 12/1974 | Shimozato | 526/33 |

FOREIGN PATENT DOCUMENTS

| | | | |
|---|---|---|---|
| 657807 | 5/1929 | France | 260/783 |
| 537092 | 4/1977 | U.S.S.R. | 525/343 |

*Primary Examiner*—C. A. Henderson
*Attorney, Agent, or Firm*—Jordan and Hamburg

[57] ABSTRACT

The present invention relates to a vulcanizable rubber composition improved in a sulfur blooming obtained by coagulatingly keeping a supersaturated sulfur within said rubber composition. For preventing said sulfur blooming, in the present invention, a surface active agent such as sodium or potassium ethylxanthate, sodium or potassium isopropylxanthate, dialkyldithiophosphoric acid, diphenylthiourea, mercaptobenzothiazole, diphenylthiocarbazone, sodium oleate, sodium stearate or octadecylamineacetate is added to a rubber composition obtained by compounding sulfur as a vulcanizing agent in the amount of 0.5 to 10 parts by weight in relation to 100 parts by weight of rubber which may be any of natural rubber, synthetic rubber and the mixtures thereof.

6 Claims, No Drawings

VULCANIZABLE RUBBER COMPOSITION IMPROVED IN SULFUR BLOOMING WITH METAL ALKYLXANTHATE

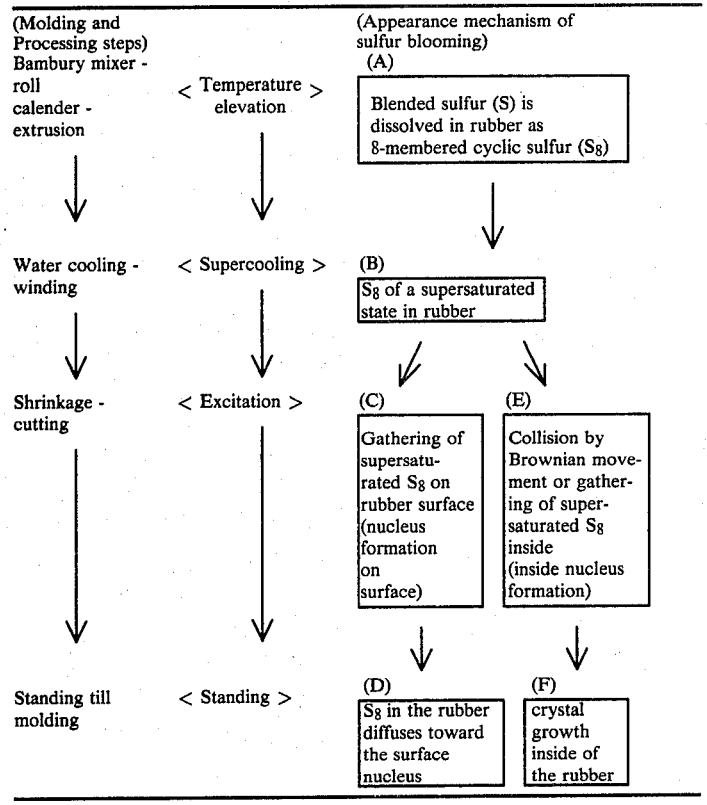

The present invention relates to a vulcanizable rubber composition improved in a sulfur blooming, and more particularly to a vulcanizable rubber composition improved in a sulfur blooming obtained by coagulatingly keeping a supersaturated sulfur within said rubber composition.

In preparation of rubber products such as tyres, belts, etc., it is often necessary to bond rubber to rubber or rubber to the other different material such as metal or organic fiber, and it is well known that the maintenance of an adhesiveness of unvulcanized rubber material have an effect upon the workability and the productivity.

One of causes to reduce the adhesiveness of the unvulcanized rubber material is an appearance of foreign materials having a much less adhesiveness than the proper adhesiveness of the unvulcanized rubber in portions or the entirety of the adhesion zone of the unvulcanized rubber material due to a prolonged standing, etc., thereby reducing a wetting area between each adhesively contacted material, that is, an appearance of the so-called blooming phenomenon. Especially, the blooming phenomenon of sulfur as the vulcanizing agent considerably reduces the adhesiveness and stickiness of the unvulcanized rubber, and thus it is keenly desired as a necessary and indispensable condition for rubber compositions to improve such sulfur blooming.

The present inventors have investigated the state of sulfur in rubber during the actual process for preparation by an X-ray micro-analyzer (XMA), an optical microscope (OE), an electron microscope (EM), and a scanning type electron microscope (SEM), and have found a mechanism of sulfur blooming appearance corresponding to the following individual preparation steps.

As a result of an extensive study to control the sulfur blooming on the basis of the above mentioned finding, it has been found that in the conventional art, for example, the sulfur blooming has been controlled by use of insoluble sulfur disclosed in Japanese Patent Publication No. 13075/61, or by use of sulfur doner disclosed in Japanese Patent Publications Nos. 6096/72 and 6498/72, so that the blended sulfur is prevented from dissolution as 8-membered cyclic structure sulfur ($S_8$) into the rubber as much as possible when the temperature is elevated, or $S_8$ dissolved in the rubber is prevented from being brought into a supersaturated state and the resulting precipitation when supercooled, taking attention to (A) and (B) in the above appearance mechanism of the sulfur blooming. However, since a transition temperature of the insoluble sulfur to $S_8$ is about 105°–110° C., it is necessary to decrease a calender speed or an extrusion speed so that the temperature may not exceed the transition temperature particularly in the calendering or extrusion step of high elastic modulus rubber. Thus, not only the productivity is lowered, but also the dispersibility of the insoluble sulfur itself is disadvantageously deteriorated. On the other hand, the use of sulfur doner has a cost problem, and thus it has been very difficult up to now to practically and effectively control the sulfur blooming.

While, (C) and (D), and (E) and (F) of the appearance mechanism of the sulfur blooming as shown above generally proceed in parallel each other. (C) and (D) are promoted by the amount and condition of excitation in the steps and standing temperature, etc., and (E) and (F) are promoted by the supercooling conditions, standing temperature, etc., and both are in a contradictive relation. Therefore, the presence of supersaturated sulfur is necessary for the formation of sulfur nucleus and growth of crystals on the rubber surface as the appearance of the sulfur blooming, and their speeds are inversely proportional to the speed of growth of the inner crystal. Thus, taking attention to these facts, the present inventors have found that the prevention of the appearance of the sulfur blooming can be solved by controlling the diffusion of the sulfur to the rubber surface by means of acting the surface active agent with said $S_8$ for coagulatingly keeping said $S_8$ so as to form a large number of the crystal nucleus and promote the growth of the inner side crystal.

The object of the present invention is to provide a vulcanizable rubber composition improved in a sulfur blooming obtained by adding a surface active agent to a rubber composition obtained by compounding sulfur as a vulcanizing agent in the amount of 0.5 to 10 parts by weight in relation to 100 parts by weight of rubber which may be any of natural rubber, synthetic rubber and the mixtures thereof, so as to coagulatingly keep a supersaturated sulfur within said vulcanizable rubber composition.

In the present invention, the surface active agent capable of coagulatingly keeping the supersaturated sulfur within the rubber composition has a oleophobic group compatible with sulfur and having relatively weak oleophilic property, and includes, for example alkylxanthate such as sodium or potassium ethylxanthate, sodium or potassium isopropylxanthate; dialkyldithiophosphoric acid, diphenylthiourea, mercaptobenzothiazole, diphenylthiocarbazone, sodium oleate, sodium stearate, octadecylamineacetate, etc., and preferably, those containing sulfur atoms in the oleophobic group, for example, alkylxanthate such as sodium or potassium ethylxanthate, sodium or potassium isopropylxanthate; dialkyldithiophosphoric acid, diphenylthiouea, mercoptobenzothiazole, diphenylthiocarbazone, etc.

In the present invention, the amount of the surface active agent to be added is 0.1–10% by weight, preferably 0.5–5% by weight, on the basis of sulfur added as the vulcanizing agent. If it is below 0.1% by weight, a satisfactory coagulation effect for making the nucleus for inner crystals growth enough to control the blooming cannot be obtained. If it is above 10% by weight, a large number of nucleus grow so much that even the nucleus on the rubber surface is also made to grow, and the sulfur blooming on the rubber surface is promoted to the contrary.

The rubber composition of the present invention requires a time for promoting the crystal growth of sulfur within the rubber and correspondingly reducing the supersaturated sulfur contributing the crystal growth on the rubber surface, and thus is suitable for treat materials, etc. which are left standing for a relatively long time after the calendering step in the rubber preparation process and are susceptible to a large excitation at the cutting.

In the rubber composition of the present invention, as the compounding ingredients other than sulfur, a vulcanizing agent other than sulfur usually used in the rubber industry, a vulcanization accelerator, a vulcanization promotor, a softening agent, an antioxidant, a reinforcing filler, etc. can be appropriately selected and mixed.

In the present invention, all kind of the synthetic rubbers such as polyisoprene rubber, polybutadiene rubber, styrene-butadiene copolymer rubber, acrylonitrile-butadiene copolymer rubber, ethylene-propylene copolymer rubber, butyl rubber, and all other rubbers can be used as the rubber composition.

In the present invention, the surface active agent added to the rubber composition gives no substantial influence to the physical properties of unvulcanized and vulcanized rubbers.

The present invention will be described in detail, referring to Examples.

EXAMPLES

A cord layer woven from nylon fiber cords of 1,260 deniers was subjected to dip treatment, and then various rubber compositions of Table 1 were sheeted, after kneading, onto the cord layer by means of three roll calender to a thickness of 2 mm at a roll temperature of 120° C. and a calender speed of 50 m/min, and the sheets were wound up. After standing for one day, a large mechanical excitation was given to the sheets by cutting, and again the sheets were wound up, and left standing for two days. Sulfur blooming appearance was investigated by photographying the rubber surface by SEM, and measuring the area of sulfur blooming appearance by an image analyzer (Omunicon made by Shimazu Seisakusho, Ltd.) to determine a blooming ratio for rubber surface.

Physical properties of various unvulcanized and vulcanized rubber compositions were determined according to JIS K 6300 and JIS K 6301, and the results are also given in Table 1.

TABLE 1-1

| Blend No. Composition | Example 1 | Example 2 | Example 3 | Example 4 | comparative Example 5 | Example 6 | Example 7 | Example 8 |
|---|---|---|---|---|---|---|---|---|
| Natural rubber | 100 | 100 | 100 | 100 | 100 | 100 | 100 | 100 |
| HAF carbon black | 50 | 50 | 50 | 50 | 50 | 50 | 50 | 50 |
| Stearic acid | 2 | 2 | 2 | 2 | 2 | 2 | 2 | 2 |
| Zinc oxide | 5 | 5 | 5 | 5 | 5 | 5 | 5 | 5 |
| Antioxidant P*1 | 1 | 1 | 1 | 1 | 1 | 1 | 1 | 1 |
| Vulcanization accelerator Nob*2 | 1 | 1 | 1 | 1 | 1 | 1 | 1 | 1 |
| Sulfur | 4 | 4 | 4 | 4 | | | | |
| Insoluble sulfur*3 | | | | | 7 | 7 | 7 | 7 |
| Potassium ethylxanthate | | 0.04 | | | | 0.04 | | |
| Potassium isopropylxanthate | | | 0.04 | | | | 0.04 | |
| Sodium stearate | | | | 0.2 | | | | 0.2 |

*1 N,N'-diphenyl-p-phenylenediamine
*2 N-oxydiethylene-2-benzothiazlsulpheneamide
*3 (CRYSTEX made by Staufler Chemical)

TABLE 1 - 2

| | | | | | Comparative | | | | Blend No. |
|---|---|---|---|---|---|---|---|---|---|
| Composition | Example 1 | Example 2 | Example 3 | Example 4 | Example 5 | Example 6 | Example 7 | Example 8 |
| Results | | | | | | | | |
| Blooming ratio (%) | 30 | 5 | 9 | 16 | 32 | 8 | 12 | 20 |
| Mooney viscosity (ML$_{1+4}$) | 83 | 83 | 83 | 83 | 75 | 76 | 73 | 74 |
| Mooney scorch time (min) | 18 | 18 | 18 | 17 | 10 | 95 | 11 | 10 |
| Hardness (degree) | 63 | 63 | 63 | 63 | 74 | 75 | 74 | 74 |
| Resilience (%) | 52 | 51 | 53 | 53 | 48 | 49 | 47 | 48 |
| Elongation (%) | 450 | 440 | 460 | 450 | 270 | 275 | 265 | 272 |
| 100% Modulus (kg/cm$^2$) | 30 | 30 | 29 | 30 | 53 | 55 | 53 | 56 |
| 200% Modulus (kg/cm$^2$) | 134 | 130 | 130 | 130 | 132 | 135 | 130 | 133 |
| Tensile strength (kg/cm$^2$) | 240 | 240 | 242 | 240 | 200 | 205 | 195 | 210 |

*[1] N,N'-diphenyl-p-phenylenediamine
*[2] N-oxydiethylene-2-benzothiazlsulpheneamide
*[3] (CRYSTEX made by Staufler Chemical)

It is apparent from the results of Table 1 that the rubber composition of the present invention containing a surface active agent have a considerably improved sulfur blooming, and furthermore the physical properties of unvulcanized and vulcanized rubbers are not substantially changed, as compared with those of the rubber composition containing no surface active agent.

What is claimed is:

1. A vulcanizable rubber composition improved in sulfur blooming characterized by adding from 0.1 to 10% by weight, based on the weight of sulfur contained in said composition, of alkylxanthate to a rubber composition obtained by compounding sulfur as a vulcanizing agent in the amount of 0.5 to 10 parts by weight in relation to 100 parts by weight of rubber which may be any of natural rubber, synthetic rubber and the mixtures thereof, so as to coagulatingly keep a supersaturated sulfur within said vulcanizable rubber composition.

2. A vulcanizable rubber composition according to claim 1, wherein said alkylxanthate is selected from the group consisting of sodium or potassium ethylxanthate, and sodium or potassium isoprophylxanthate.

3. A vulcanizable rubber composition according to claim 1, wherein 0.5 to 5% by weight of alkylxanthate is added on the basis of the sulfur added as the vulcanizing agent.

4. A vulcanizable rubber composition according to claim 1, wherein 0.1 to 1% by weight of alkylxanthate is added on the basis of the sulfur added as the vulcanizing agent.

5. A vulcanizable rubber composition according to claim 1, wherein 0.57 to 1% by weight of alkylxanthate is added on the basis of the sulfur added as the vulcanizing agent.

6. A vulcanizable rubber composition according to claim 1 wherein said rubber is selected from the group consisting of polyisoprene rubber, polybutadiene rubber, styrene-butadiene copolymer rubber, acrylonitrite-butadiene copolymer rubber, ethylene-propylene copolymer rubber and butyl rubber.

* * * * *